(12) United States Patent
Kim et al.

(10) Patent No.: US 6,324,189 B1
(45) Date of Patent: Nov. 27, 2001

(54) OPTICAL DEVICE FOR MODULATING A HIGH FREQUENCY OPTICAL SIGNAL

(75) Inventors: Ho-Young Kim, Taejon; Kwang-Yong Kang, Sacheon-si; Su-Jae Lee, Pusan-si; Seok-Kil Han, Taejon, all of (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/712,661

(22) Filed: Nov. 13, 2000

(30) Foreign Application Priority Data

Dec. 23, 1999 (KR) ................................. 99-61149
Sep. 19, 2000 (KR) ................................. 00-54801

(51) Int. Cl.[7] .................................................. H01S 3/30
(52) U.S. Cl. .................................. 372/6; 372/18; 372/94
(58) Field of Search ........................... 385/1–3, 39–42, 385/28, 29; 359/241, 341, 346–349; 372/6, 94

(56) References Cited

U.S. PATENT DOCUMENTS

| | | | |
|---|---|---|---|
| H1813 | * 11/1999 | Kersey | 372/94 |
| 5,359,612 | * 10/1994 | Dennis et al. | 372/18 |
| 5,363,192 | * 11/1994 | Diels et al. | 356/350 |
| 5,365,531 | * 11/1994 | Lin et al. | 372/18 |
| 5,577,057 | * 11/1996 | Frisken | 372/18 |
| 5,734,665 | * 3/1998 | Jeon et al. | 372/6 |
| 5,828,680 | * 10/1998 | Kim et al. | 372/18 |
| 5,898,716 | * 4/1999 | Ahn et al. | 372/6 |
| 6,163,630 | * 12/2000 | Evans | 372/6 |

* cited by examiner

*Primary Examiner*—Georgia Epps
*Assistant Examiner*—Tuyen Tra
(74) *Attorney, Agent, or Firm*—Blakely Sokoloff Taylor & Zafman (57) ABSTRACT

An optical device for use in generating a high frequency optical signal includes a light source for generating a pumping light beam, a first oscillator for generating a first light beam with a plurality of modes by using the pumping light beam, an optical element for selecting a first mode from the modes, a second oscillator for generating a second light beam of a second mode by using the selected first mode; and an optical coupler for coupling the selected first mode to the second mode to induce a beat phenomenon therebetween. In the optical device, the first oscillator generates the high frequency optical signal by the beat phenomenon.

17 Claims, 7 Drawing Sheets

OPTICAL DEVICE FOR MODULATING A HIGH FREQUENCY OPTICAL SIGNAL

FIELD OF THE INVENTION

The present invention relates to an optical device for generating a high frequency optical signal; and, more particularly, to an optical device incorporating therein a ring oscillator and a linear oscillator for inducing a beat phenomenon which is used for generating a high frequency optical signal.

DESCRIPTION OF THE PRIOR ART

As is well known, a semiconductor laser has achieved substantial success as a light source and an oscillator in fiber optic communication systems because of their capability to provide a high speed, a direct current modulation and their relative low cost per component.

However, there is still a demand for developing a high frequency light source to implement a wireless multimedia technology in coupled with the high speed fiber communication network. In order to meet this demand, several studies for applying the semiconductor laser diode to the high frequency light source have been developed recently.

But, the semiconductor laser diode has an inherent shortcoming that it has a low modulation frequency range.

SUMMARY OF THE INVENTION

It is, therefore, an object of the present invention to provide an optical device incorporating therein a ring oscillator and a linear oscillator coupled to the ring oscillator for generating a high frequency optical signal by using a beat phenomenon between the ring and the linear oscillators.

In accordance with one aspect of the present invention, there is provided an optical device for modulating a high frequency optical signal, comprising: a light source for generating a pumping light beam; a first oscillator for generating a first light beam with a plurality of modes by using the pumping light beam; an optical element for selecting a first mode from the modes; a second oscillator for generating a second light beam of a second mode by using the selected first mode; and an optical coupler for coupling the selected first mode to the second mode to induce a beat phenomenon therebetween, whereby the first oscillator outputs the high frequency optical signal generated by the beat phenomenon.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

There are provided in FIGS. 1 to 8 schematic views of optical devices 100, 200 for generating high frequency optical signals and graphs showing experimental data thereof in accordance with preferred embodiments of the present invention.

Figure 1:
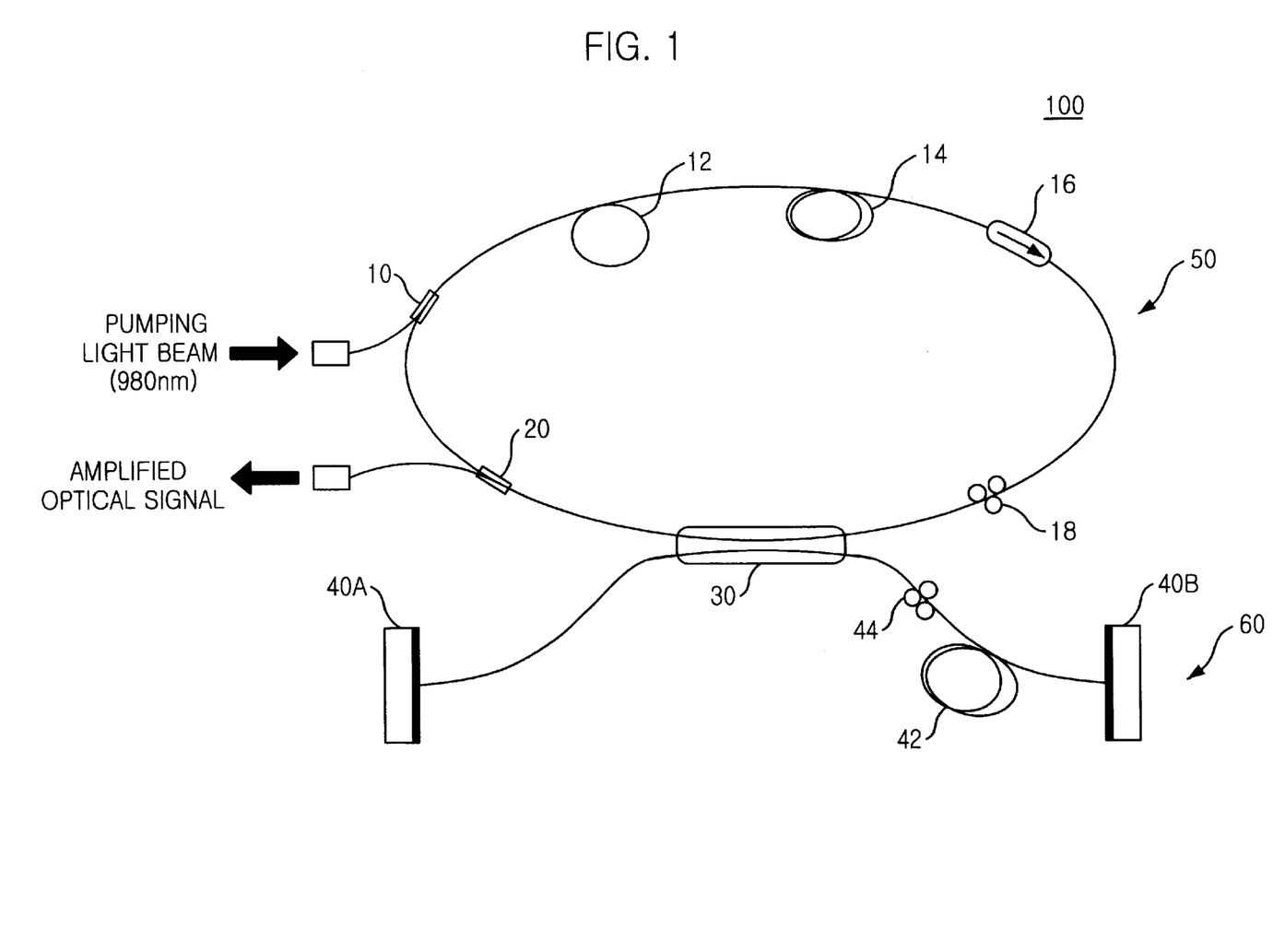
FIG. 1 shows a schematic view representing an optical device incorporating therein a ring oscillator and a linear oscillator coupled to the ring oscillator for generating a high frequency optical signal in accordance with a first preferred embodiment of the present invention.

In FIG. 1, there is provided a schematic view of the inventive optical device 100 comprising a light source, e.g., a laser diode, for generating a pumping light beam, a ring oscillator 50, a linear oscillator 60 and an optical coupler 30 for coupling the ring oscillator 50 to the linear oscillator 60. The ring oscillator 50 includes a wavelength division multiplexer (WDM) 10, a light amplifying fiber (LAF) 12, a first dispersion shifted fiber (DSF) 14, an isolator 16, a first mode controller 18 and an output port 20. The linear oscillator 60 includes a first and a second mirrors 40A, 40B, a second mode controller 44 and a second DSF 42.

In the optical device 100, the pumping light beam is supplied into the ring oscillator 50 by using the WDM 10, wherein a wavelength of the pumping light beam has a range from approximately 960 nm to approximately 980 nm. The supplied pumping light beam is amplified by the LAF 12 incorporated into the ring oscillator 50. It is possible that an erbium doped fiber can be utilized as the LAF 12. And then, the amplified light beam is inputted to the DSF 14 so as to compensate dispersions caused by the ring oscillator 50.

Thereafter, the dispersion compensated light beam is transmitted to the mode controller 18 through the isolator 16 that makes a light beam transmit to ensure the desired unidirectional operation of the ring oscillator 50 after passing therethrough. After the light beam passes through the mode controller 18, a portion of the light beam travels to the output port 20 and the remaining portion of the light beam travels to the linear oscillator 60 through the optical coupler 30. If the mode controller 18 does not operate, the light beam oscillated in the ring oscillator 50 has a first natural mode, which is determined by a birefringence of the ring oscillator 50.

On the other hands, the remaining portion of the light beam is inputted to the linear oscillator 60 by using the optical coupler 30. In the first preferred embodiment, the optical coupler 30 includes four ports so as to couple two of them to the ring oscillator 50 and to couple the other to the linear oscillator 60. It is preferable that a portion, e.g., 50%, of the light beam is fed into the output port 20 and the remaining portion, e.g., 50%, of the light beam is fed into the linear oscillator 60. And also, the remaining portion of the light beam is changed to a second natural mode by a birefringence of the linear oscillator 60. If the second mode controller 44 does not operate, this second natural mode of the light beam is oscillated from the first mirror 40A to the second mirror 40B with passing through the second mode controller 44 and the second DSF 42 in the linear oscillator 60. The first and the second mirrors 40A, 40B are attached to ends of the linear oscillator 60, respectively. It is preferable that the LAF 12, the first and the second DSFs 14, 42 are approximately 20 m, 60 m and 20 m, respectively.

In the first preferred embodiment, the mode controller 18 can change the first natural mode into a new mode. After the remaining portion of the light beam is inputted to the linear oscillator 60, the mode controller 18 is operated to change the first natural mode into the new mode. There is occurred a beat phenomenon between the second natural mode and the new mode. It is preferable that the mode controller 18 is placed between the isolator 16 and the optical coupler 30. The mode controller 18 is capable of changing the first natural mode by controlling an orientation angle thereof. After the mode is changed at the mode controller 18, a light beam having the selected mode is oscillated in the ring oscillator 50.

In the output port 20, an amplified optical signal having a beat frequency is outputted, wherein the beat frequency can be obtained by the beat phenomenon. The beat frequency can be modulated by changing an orientation angle of the mode controller 18. It is possible that the beat frequency is modulated by changing an orientation angle of the mode controller 44 in the linear oscillator 60.

Figure 2:
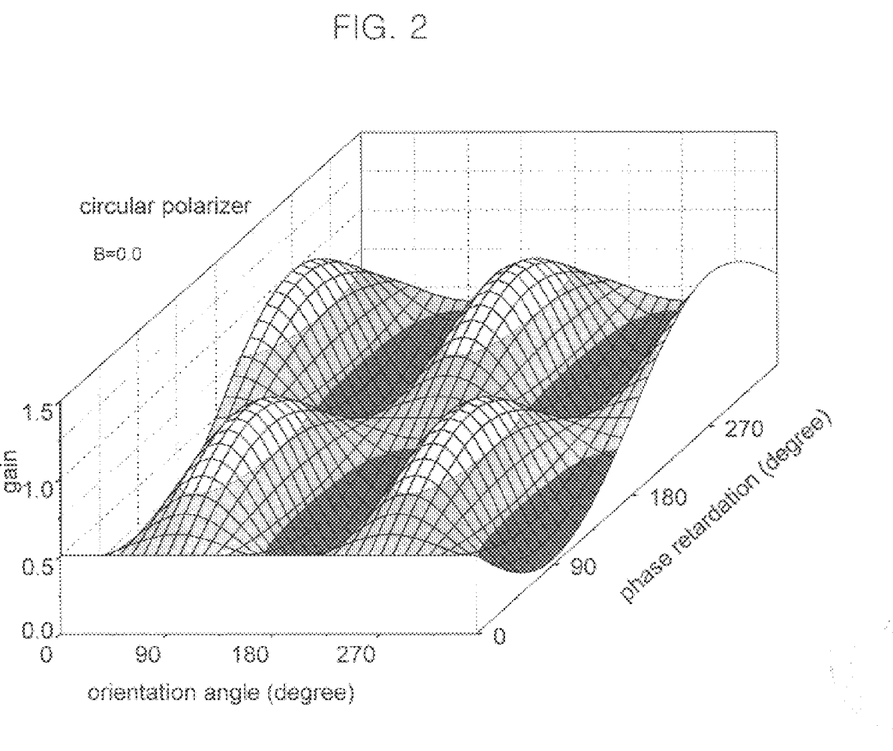
FIG. 2 is a three-dimensional graph illustrating a gain controlled by changing an orientation angle of a mode controller incorporating the ring oscillator.

FIG. 2 is a three-dimensional graph illustrating a gain controlled by changing an orientation angle of the mode controller 18. As shown in FIG. 2, the gain of the ring oscillator 50 is sensitively changed in response to the birefringence thereof.

Figure 3:
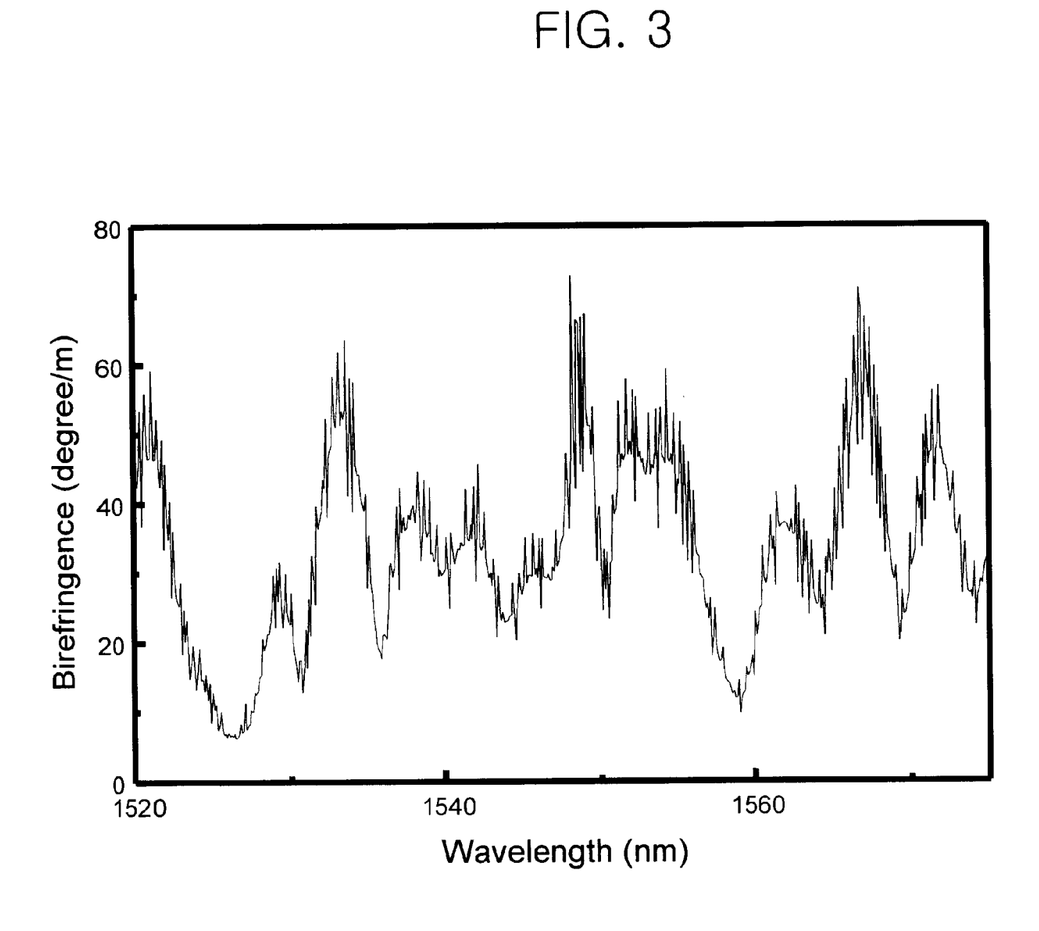
FIG. 3 represents a graph of the index of birefringence versus wavelengths in accordance with the first preferred embodiment of the present invention.

FIG. 3 shows a graph representing a relationship between the index of birefringence and wavelengths with respect to the manufacturing conditions of the optical fiber in accordance with the first preferred embodiment of the present invention.

Figure 4:
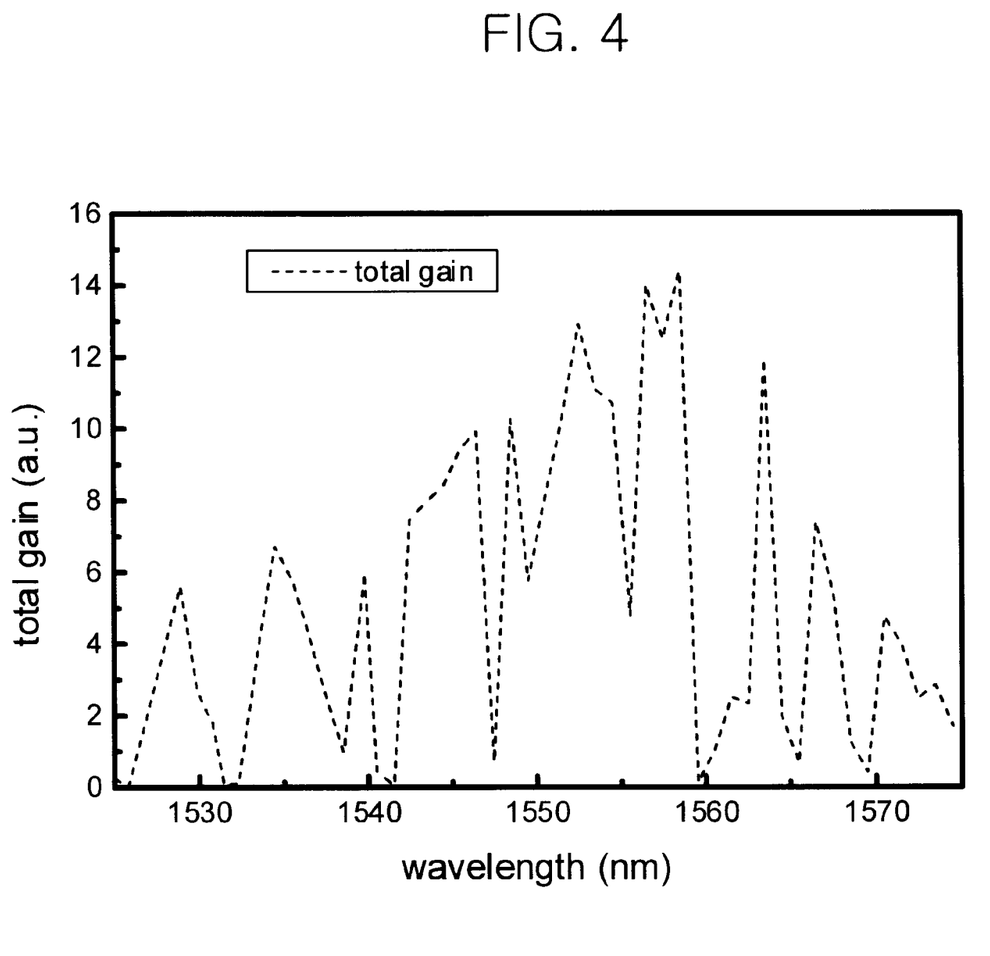
FIG. 4 illustrates a graph of a total gain versus wavelengths in accordance with the first preferred embodiment of the present invention.

FIG. 4 illustrates a graph of a total gain versus wavelengths in accordance with the first preferred embodiment of the present invention. This graph is obtained by summing the gain of the birefringence to the gain of the LAF 12.

Figure 5:
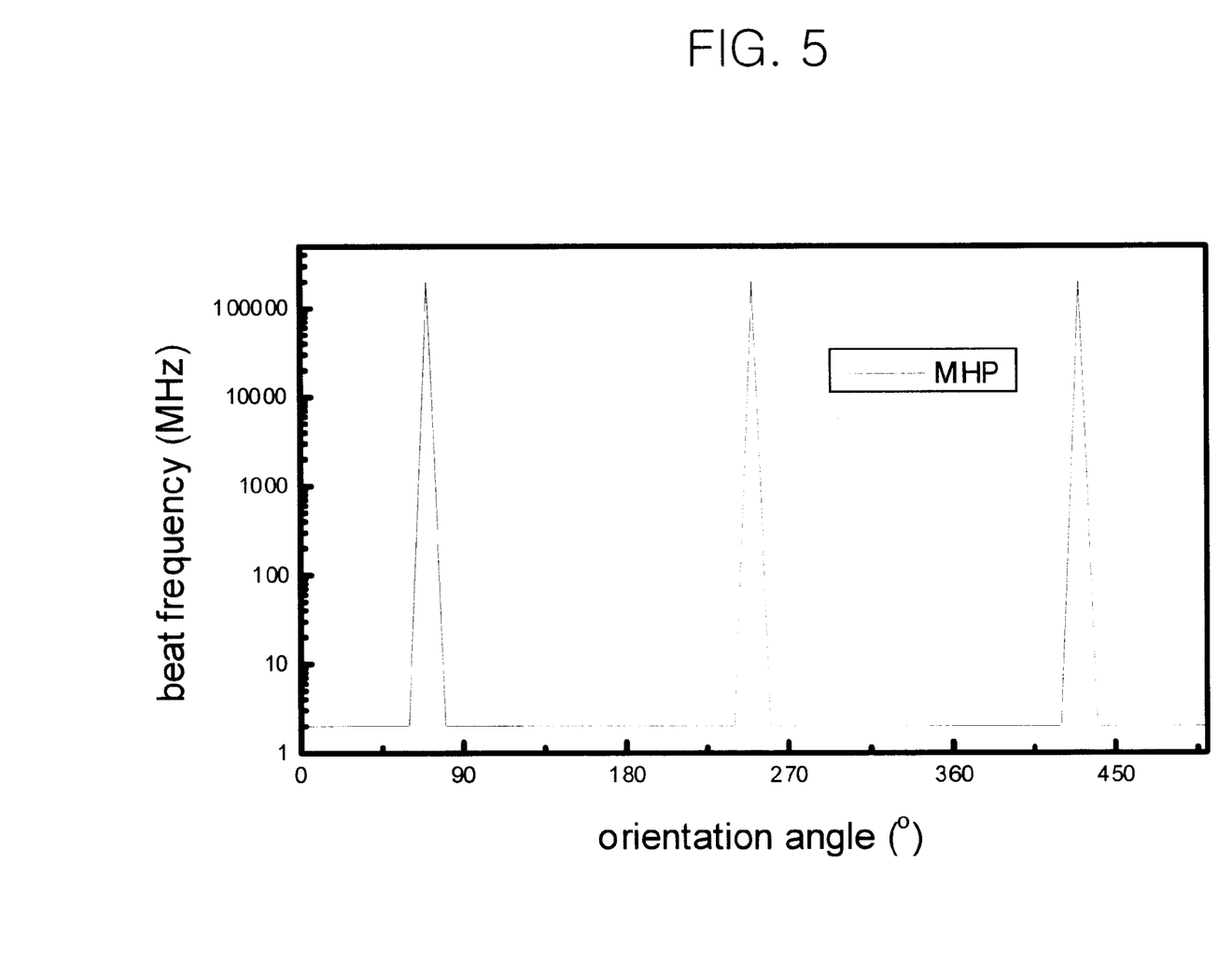
FIG. 5 depicts a graph of beat frequency versus orientation angles of the mode controller in the ring oscillator.

FIG. 5 depicts a graph of beat frequency versus orientation angles of the mode controller in the ring oscillator in accordance with the first preferred embodiment of the present invention. This implies that the beat frequency can be modulated in this range by controlling the mode controller 18.

In comparison with the prior art, the first preferred embodiment of the present invention can generate a high frequency optical signal by utilizing a beat phenomenon between a first optical signal and a second optical signal. This is achieved by coupling a ring oscillator to a linear oscillator.

Figure 6:
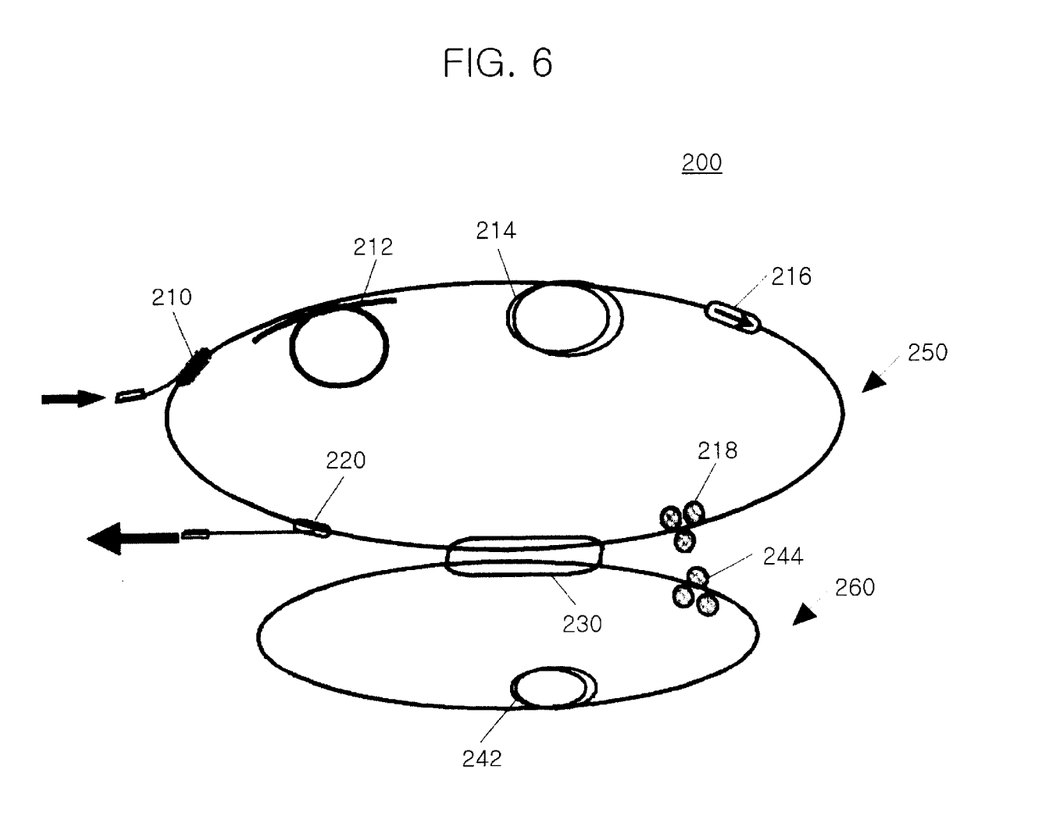
FIG. 6 presents a schematic view representing an optical device incorporating therein a pair of ring oscillators for generating a high frequency optical signal in accordance with a second preferred embodiment of the present invention.

In FIG. 6, there is provided a schematic view of the inventive optical device 200 comprising a light source, e.g., a laser diode, for generating a pumping light beam, a first ring oscillator 250, a second ring oscillator 260 and an optical coupler 230 for coupling the first ring oscillator 250 to the second ring oscillator 260. The first ring oscillator 250 includes a wavelength division multiplexer (WDM) 210, a light amplifying fiber (LAF) 212, a first dispersion shifted fiber (DSF) 214, an isolator 216, a first mode controller 218 and an output port 220. The second ring oscillator 260 includes a second mode controller 244 and a second DSF 242.

In the optical device 200, the pumping light beam is supplied into the first ring oscillator 250 by using the WDM 210, wherein a wavelength of the pumping light beam has a range from approximately 960 nm to approximately 980 nm. The supplied pumping light beam is amplified by the LAF 212 incorporated into the first ring oscillator 250. It is possible that an erbium doped fiber can be utilized as the LAF 212. And then, the amplified light beam is inputted to the DSF 214 so as to compensate dispersions caused by the first ring oscillator 250.

Thereafter, the dispersion compensated light beam is transmitted to the mode controller 218 through the isolator 216 that makes a light beam transmit to ensure the desired unidirectional operation of the first ring oscillator 250 after passing therethrough. After the light beam passes through the mode controller 218, a portion of the light beam travels to the output port 220 and the remaining portion of the light beam travels to the linear oscillator 260 through the optical coupler 230. If the mode controller 218 does not operate, the light beam oscillated in the first ring oscillator 250 has a first natural mode, which is determined by a birefringence of the first ring oscillator 250.

On the other hands, the remaining portion of the light beam is inputted to the second ring oscillator 260 by using the optical coupler 230. In the second preferred embodiment, the optical coupler 230 includes four ports so as to couple two of them to the first ring oscillator 250 and to couple the other to the second ring oscillator 260. It is preferable that a portion, e.g., 50%, of the light beam is fed into the output port 20 and the remaining portion, e.g., 50%, of the light beam is fed into the second ring oscillator 260. And also, the remaining portion of the light beam is changed to a second natural mode by a birefringence of the second ring oscillator 260. If the second mode controller 244 does not operate, this second natural mode of the light beam is oscillated into the second ring oscillator 260 with passing through the second mode controller 244 and the second DSF 242.

In the preferred embodiment, the mode controller 218 can change the first natural mode into a new mode. After the remaining portion of the light beam is inputted to the second ring oscillator 260, the mode controller 218 is operated to change the first natural mode into the new mode. There is occurred a beat phenomenon between the second natural mode and the new mode.

In the output port 220, an amplified optical signal having a beat frequency is outputted, wherein the beat frequency can be obtained by the beat phenomenon. The beat frequency can be modulated by changing an orientation angle of the mode controller 218. It is possible that the beat frequency is modulated by changing an orientation angle of the mode controller 244 in the second ring oscillator 260.

Figure 7:
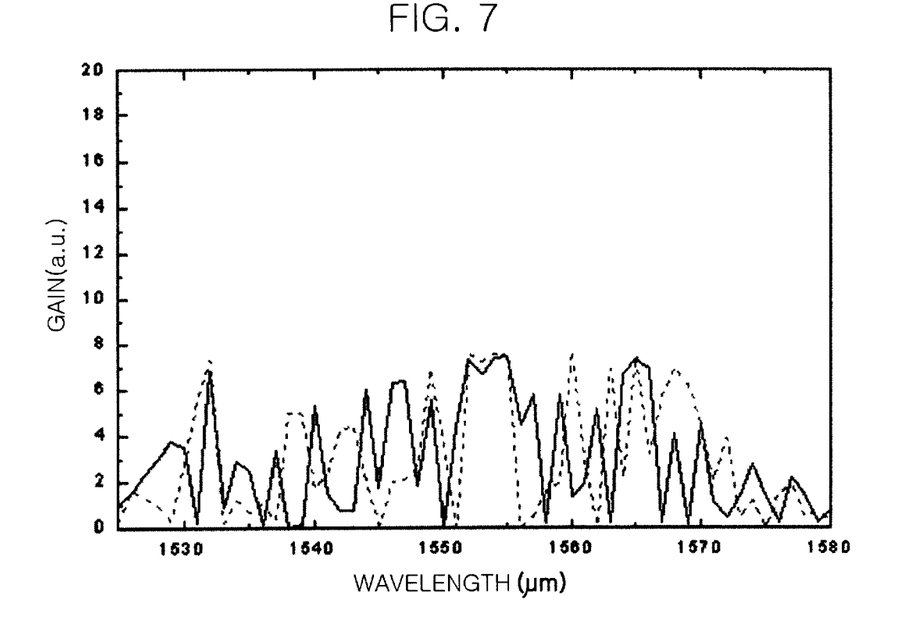
FIG. 7 represents a graph of the index of birefringence versus wavelengths in accordance with the second preferred embodiment of the present invention.

FIG. 7 illustrates a graph of a gain versus wavelengths in accordance with the second preferred embodiment of the present invention. This graph is obtained by summing the gain of the birefringence to the gain of the LAF 212, wherein a dotted line and a solid line represent a first and a second preferred embodiments, respectively.

Figure 8:
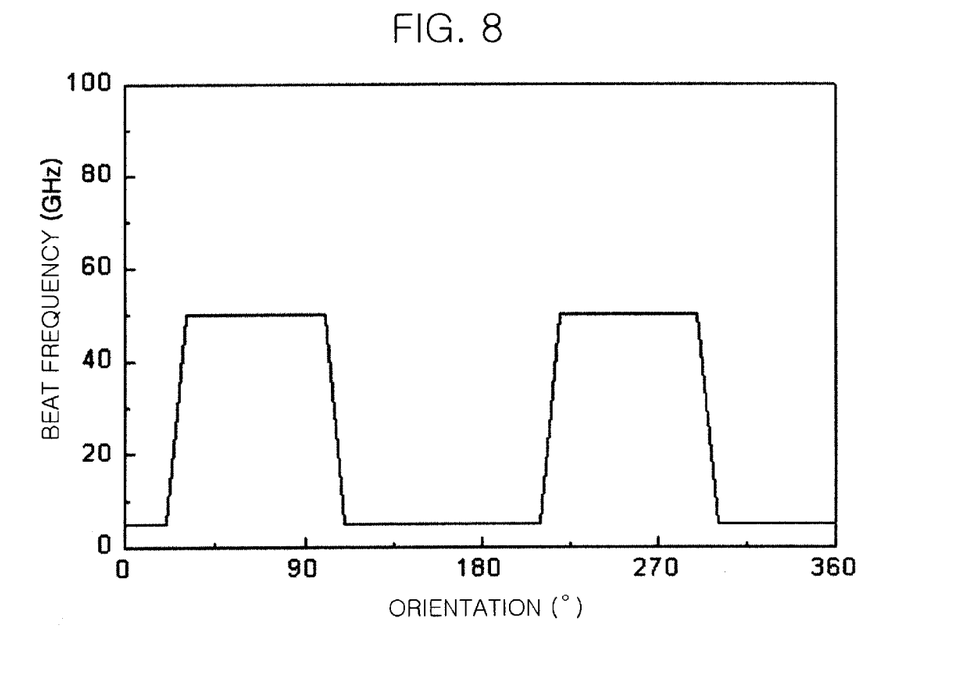
FIG. 8 illustrates a graph of a gain versus wavelengths in accordance with the second preferred embodiment of the present invention.

FIG. 8 depicts a graph of beat frequency versus orientation angles of the mode controller in the ring oscillator in accordance with the second preferred embodiment of the present invention. This implies that the beat frequency can be modulated in this range by controlling the mode controller 218.

In comparison with the first preferred embodiment, the second preferred embodiment can easily generate a high frequency optical signal by coupling a first ring oscillator to a second ring oscillator.

While the present invention has been described with respect to the particular embodiments, it will be apparent to those skilled in the art that various changes and modifications may be made without departing from the scope of the invention as defined in the following claims.

What is claimed is:

1. An optical device for modulating a high frequency optical signal, comprising:

a light source for generating a pumping light beam, a first oscillator for generating a first light beam with a plurality of modes by using the pumping light beam;

an optical element for selecting a first mode from the modes;

a second oscillator for generating a second light beam of a second mode by using the selected first mode; and an optical coupler for coupling the selected first mode to the second mode to induce a beat phenomenon therebetween, whereby the first oscillator outputs the high frequency optical signal generated by the beat phenomenon.

2. The optical device of claim 1, wherein the first oscillator further includes a light amplifying fiber for amplifying the first light beam.

3. The optical device of claim 2, wherein the first oscillator further includes a wavelength division multiplexer (WDM) for coupling the pumping light beam to the first oscillator.

4. The optical device of claim 3, wherein the first oscillator further includes a dispersion shifted fiber (DSF) for compensating dispersions caused by the first oscillator.

5. The optical device of claim 4, wherein the first oscillator further includes an isolator for directing the first light beam to one direction.

6. The optical device of claim 5, wherein the optical element is placed between the optical coupler and the isolator.

7. The optical device of claim 6, wherein the optical element selects the first mode by controlling an orientation angle thereof.

8. The optical device of claim 1, wherein the first oscillator is made of an optical fiber in the form of a ring.

9. The optical device of claim 8, wherein the second oscillator is made of an optical fiber in the form of a curved line.

10. The optical device of claim 9, wherein the second oscillator further includes a pair of total reflection mirrors, each mirror attached to ends of the second oscillator, respectively.

11. The optical device of claim 10, wherein the second oscillator further includes an optical element for controlling the second mode.

12. The optical device of claim 11, wherein the second oscillator further includes a second DSF for compensating dispersions caused by the second oscillator.

13. The optical device of claim 8, wherein the second oscillator is made of an optical fiber in the form of a ring.

14. The optical device of claim 1, wherein the optical coupler includes four ports.

15. The optical device of claim 14, wherein two ports are coupled to the first oscillator and the other two ports are coupled to the second oscillator.

16. The optical device of claim 15, wherein a wavelength of the pumping light has a range from approximately 960 nm to approximately 980 nm.

17. The optical device of claim 1, wherein the light source is a laser diode.

* * * * *